United States Patent
Garassino et al.

(10) Patent No.: US 7,055,786 B2
(45) Date of Patent: Jun. 6, 2006

(54) DEVICE FOR FIXING MESH CABLE TRAYS TO A SUPPORT BRACKET

(75) Inventors: Luca Garassino, Novi Ligure (IT); Alan Finco, Spinetta Marengo (IT)

(73) Assignee: Legrand S.p.A, Zibido San Giacomo (IT)

( * ) Notice: Subject to any disclaimer, the term of this patent is extended or adjusted under 35 U.S.C. 154(b) by 25 days.

(21) Appl. No.: 10/358,357

(22) Filed: Feb. 5, 2003

(65) Prior Publication Data

US 2003/0150968 A1   Aug. 14, 2003

(30) Foreign Application Priority Data

Feb. 6, 2002   (IT)  .......................... TO20020025 U

(51) Int. Cl.
*A47K 1/00* (2006.01)

(52) U.S. Cl. .................. 248/220.22; 248/300; 403/384

(58) Field of Classification Search .................. 248/49, 248/220.22, 68.1, 61, 58, 67.5, 74.5, 74.1, 248/222.41, 222.52, 300, 500; 403/282, 403/384 X, 187, 188, 395, 385, 346, 353; 174/48, 135, 248, 49

See application file for complete search history.

(56) References Cited

U.S. PATENT DOCUMENTS

| | | | | |
|---|---|---|---|---|
| 1,233,181 A | * | 7/1917 | Brns | 248/74.5 |
| 3,042,351 A | * | 7/1962 | Du Bois | 248/49 |
| 3,225,720 A | * | 12/1965 | Maslow | 108/64 |
| 3,521,843 A | * | 7/1970 | Ogle | 248/58 |
| 4,226,193 A | * | 10/1980 | Gindel | 108/192 |
| 5,372,341 A | * | 12/1994 | Witherbee et al. | 248/49 |

FOREIGN PATENT DOCUMENTS

| | | |
|---|---|---|
| EP | 0332746 A2 * | 11/1988 |
| EP | 1 039 198 A1 | 9/2000 |
| ES | 1 023 171 U | 6/1993 |
| FR | 2 017 070 | 5/1970 |
| WO | WO 00/27005 | 5/2000 |

\* cited by examiner

*Primary Examiner*—Ramon O Ramirez
(74) *Attorney, Agent, or Firm*—Sughrue Mion, PLLC

(57) ABSTRACT

A device for fixing a mesh cable tray to a profiled support section having a plurality of apertures formed in a surface for supporting the tray includes an element having a substantially semi-cylindrical engagement portion which can enclose a portion of a wire of the tray and can restrain it against the support surface. A tail plate is provided which can cooperate with the section on the side opposite to the support surface. The tail plate is connected to the support section by a screw connector.

5 Claims, 2 Drawing Sheets

DEVICE FOR FIXING MESH CABLE TRAYS TO A SUPPORT BRACKET

BACKGROUND OF THE INVENTION

The present invention relates to the installation of mesh cable trays and, more specifically, to a device for fixing a tray to a profiled support section.

A mesh cable tray comprises a series of longitudinal wires and a series of transverse wires connected to one another at nodes to form a grid, in which the transverse wires are generally U-shaped.

During the installation of these trays on walls, profiled support sections such as brackets or similar suspended elements are used for the anchorage of a tray in the region of its base or of one side.

Simple solutions for the anchorage of the tray to the support section provide for the formation of projecting tabs on the supporting surface of the section, for restraining respective portions of longitudinal wires of the tray.

These tabs can be produced, for example, by shearing and raising a portion of the support surface so as to create a space which can be engaged by a portion of wire. Once the tray is arranged in position, the tabs are bent onto the corresponding wires to hold them in position. A solution of this type is described in Spanish utility model ES 1 023 171.

Improved solutions have recently been proposed, which provide for the production of simple support sections by forming one or more slots in the support surface which is to receive the tray and by engaging the tray by means of separate and removable fixing elements. International patent application WO 00/27005 describes a device for the engagement of a tray wire on a support element having a flat face for supporting the tray, provided with at least one hole or slot. The device is formed by a substantially flat plate projecting from which is a tab which can extend through the slot and can be engaged on the wire. One or more claws formed on the device enable it to be locked relative to the support element by friction.

SUMMARY OF THE INVENTION

European patent application EP 1 039 198 describes an element for fixing mesh trays to brackets having a series of slots; the element is constituted by a clip formed by two arms disposed in a V-shaped arrangement and movable resiliently apart and/or towards one another; the clip can be driven into a slot in the support bracket. Each arm is extended at an angle at the base of the clip to form a plate coplanar with the support surface of the bracket which is shaped in a manner such that, on one side, it grasps and encircles a wire of the tray and, on the other side, it grasps a rim of the slot in which the element is fitted, ensuring the stability of the assembly in the mounted configuration.

The object of the present invention is to provide an alternative to the known solutions by providing a fixing device which is easy to produce, which has a structure that is resistant to deformation, and which can be fixed firmly and securely to the support section. According to the present invention, this object is achieved by means of a fixing device having a plurality of apertures formed in a surface for supporting the tray.

Particular embodiments of the invention are defined in the dependent claims.

Further characteristics and advantages of the invention will be explained in greater detail in the following detailed description of an embodiment thereof, provided by way of non-limiting example with reference to the appended drawings, in which:

DETAILED DESCRIPTION OF THE INVENTION

An element of the fixing device is generally indicated 10.

The element comprises a tail plate 12 and a C-shaped engagement end 14, remote from the plate 12, forming a substantially semicylindrical seat for receiving a wire of the tray.

The engagement end is connected to the tail plate by a bent neck 16 having transverse dimensions considerably smaller than those of the plate 12.

Figure 1:
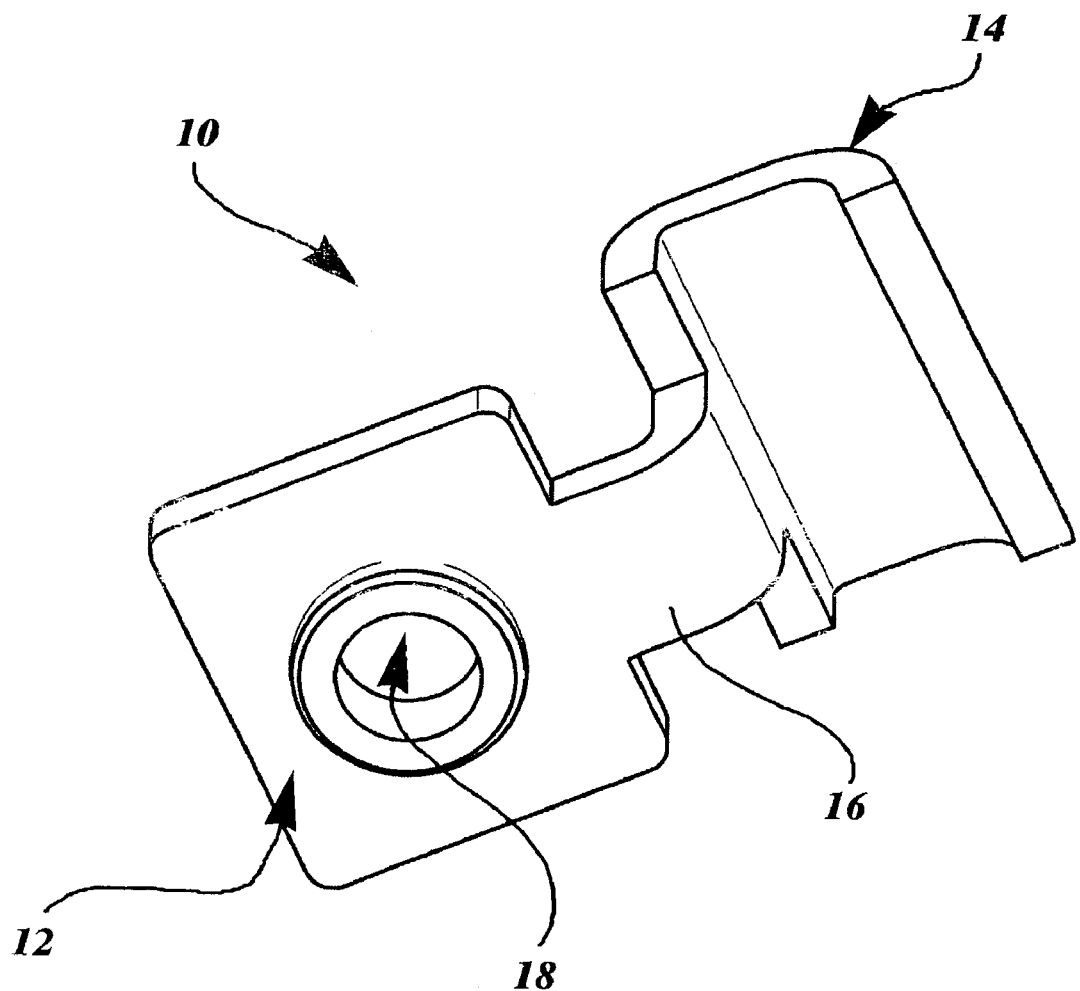
FIG. 1 is a perspective view of an element of the fixing device according to the invention.

According to the currently-preferred embodiment shown in FIG. 1, the neck extends along the longitudinal axis of the element 10 with a substantially L-shaped profile so as to offset the engagement end 14 from the plane in which the tail plate 12 lies.

The plate has a central through-hole 18 for receiving screw fixing means for connecting the element 10 to a profiled section for supporting the tray.

Alternatively, the plate may have an internally-threaded, recessed central portion produced by drawing.

Figure 2:
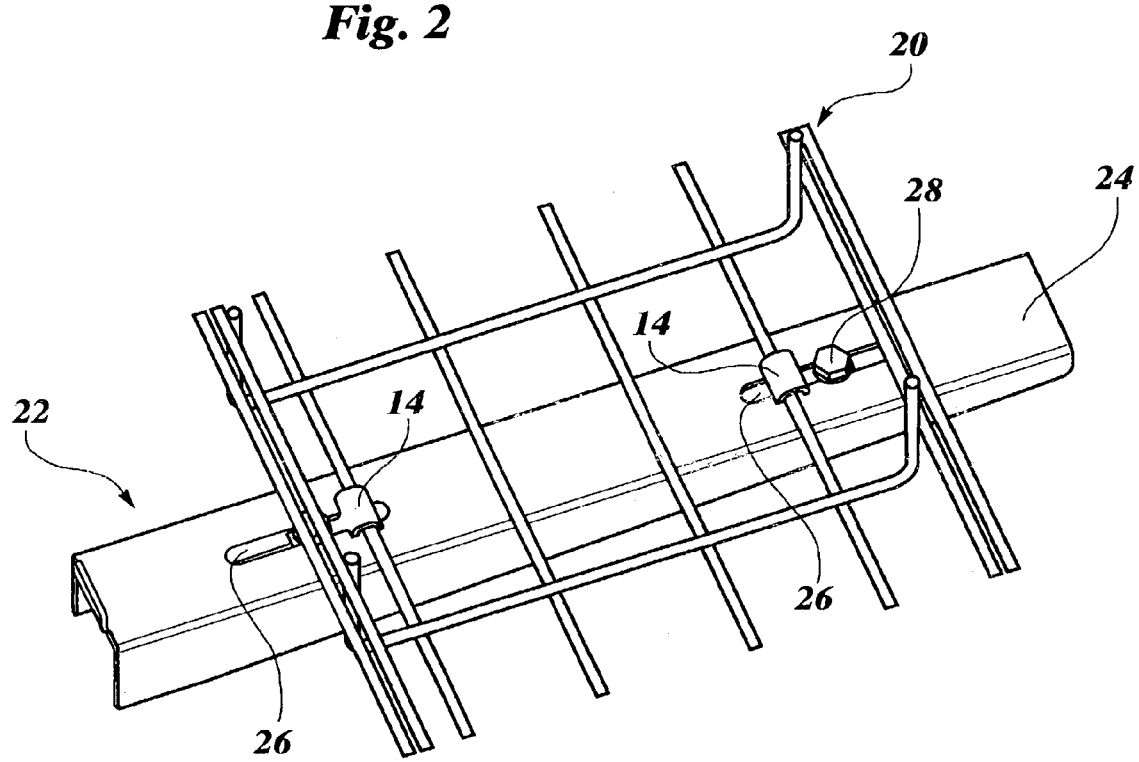
FIG. 2 is an overall view of a portion of a mesh cable tray mounted on a support bracket by means of the elements of FIG. 1.

With reference to FIG. 2, this figure shows a portion of a mesh cable tray 20 fixed to a support section 22.

In the face which constitutes the support surface 24 for the tray, the section has a plurality of elongate apertures or slots 26 through each of which a fixing element 10 extends when the tray is in the mounted configuration on the bracket.

The tray is arranged on the support section in a manner such as to overlap at least a pair of slots in the region of a pair of base longitudinal wires.

Each element 10 is arranged in position by the insertion of the element through the slot by means of the tail plate or the engagement end, until its narrow neck extends through the aperture, and then rotating it to the engagement position.

In the mounted condition, the element 10 encloses a portion of a longitudinal wire of the tray with its engagement end 14 so as to hold it against the support surface 24 of the section and has its tail plate 12 disposed on the opposite side of that surface.

As can be seen in FIG. 2, the neck 16 is designed with dimensions such that it can extend through the slot 26 in the mounted condition, and the tail plate and the engagement end extend transversely beyond the edges of the slot so as to prevent the element 10 from slipping out once it has been inserted.

The element 10 is then clamped by bolting of the tail plate to the section through the slot 26, for example, by means of a bolt 28 and a corresponding nut (not shown), the shank of the bolt being arranged through the through-hole 18 and the head having transverse dimensions greater than the width of the slot so as to clamp the element in abutment with the support surface 24 of the section.

According to an alternative embodiment, the bolting may take place by the screwing of a clamping bolt into an internally-threaded through-hole or into a blind hole of the plate 12, produced by drawing, rendering the operation even easier for a fitter.

The section 22 may be mounted on a wall so as to project horizontally therefrom and to constitute a support bracket for the tray, but may equally well be arranged vertically; in any case, the tray can be held firmly by the fixing elements having the characteristics described.

Naturally, the principle of the invention remaining the same, the forms of embodiment and details of construction may be varied widely with respect to those described and illustrated purely by way of non-limiting example, without thereby departing from the scope of protection defined by the appended claims.

What is claimed is:

1. A device for fixing a mesh cable tray to a profiled support section having a plurality of apertures formed in a surface for supporting the tray, the device comprising engagement means for restraining a wire of the tray and means for fixing the device to the support section, said engagement means for restraining a wire of the tray comprising substantially semicylindrical engagement portion which, in a mounted condition, can enclose a portion of wire of the tray and restrain the tray against the support surface, and said means for fixing the device to the support section comprising a substantially flat tail plate which, in the mounted condition, can cooperate with the section on the side opposite to the support surface, and screw clamping means for connecting the tail plate to the support section, the engagement portion and the tail plate being arranged in parallel planes and being connected by an intermediate portion arranged to extend through one of the apertures in the mounted condition.

2. A device according to claim 1, wherein the clamping means comprise a connecting bolt and the tail plate has an internally threaded through-hole suitable for the screwing of the bolt.

3. A device according to claim 1, wherein the clamping means comprise a connecting bolt and the tail plate has a blind threaded hole suitable for the insertion and fixing of the bolt.

4. A supporting assembly for a mesh cable tray including:

a profiled support section having a plurality of apertures formed in a surface for supporting the tray; and a device for fixing the tray to the support section, the device comprising engagement means for restraining a wire of the tray and means for fixing the device to the support section, wherein said engagement means for restraining a wire of the tray comprise a substantially semicylindrical engagement portion which, in a mounted condition, can enclose a portion of wire of the tray and restrain the tray against the support surface, and said means for fixing the device to the support section comprise a substantially flat tail plate which, in the mounted condition, can cooperate with the section on the side opposite to the support surface, and screw clamping means for connecting the tail plate to the support section, the engagement portion and the tail plate being arranged in parallel planes and being connected by an intermediate portion having a width less than that of one of the apertures of the support section so as to extend through the aperture in the mounted condition.

5. A supporting assembly according to claim 4, wherein the engagement portion and the tail plate of the fixing device extend transversely relative to the support section for a distance greater than the width of the aperture of the support section receiving the device.

* * * * *